Fig. 1.

1,1'dihydroxy-3,3'dicarboxy-8,8'digentiobiosyloxy-10,10'dihydrodianthrone

INVENTOR
CHARLES AUBREY FRIEDMANN
HERBERT ALAN RYAN
BY Stanley Wolder
ATTORNEY

Jan. 16, 1968  C. A. FRIEDMANN ET AL  3,364,113
SENNA PREPARATIONS AND METHODS OF MAKING AND USING THEM
Filed Jan. 21, 1966  2 Sheets-Sheet 2

Fig.2.

8,8'-diglucosyl-10,10'-dihydrorheindianthrone

INVENTOR
CHARLES AUBREY FRIEDMANN
HERBERT ALAN RYAN
BY *Stanley Wolder*
ATTORNEY

United States Patent Office

3,364,113
Patented Jan. 16, 1968

3,364,113
SENNA PREPARATIONS AND METHODS OF
MAKING AND USING THEM
Charles Aubrey Friedmann, Church Row, London, and Herbert Alan Ryan, Bedford Park, London, England, assignors to Westminster Laboratories Limited, London, England, a corporation of the United Kingdom
Continuation-in-part of application Ser. No. 189,286, Apr. 23, 1962, which is a continuation-in-part of application Ser. No. 760,534, Sept. 12, 1958. This application Jan. 21, 1966, Ser. No. 522,098
16 Claims. (Cl. 167—56)

This invention relates to new and novel derivatives of senna which are useful therapeutically. In particular, it relates to 1,1'-dihydroxy-3,3'-dicarboxy-8,8'-digentiobiosyloxy-10,10'-dihydrodianthrone, its pharmaceutically acceptable basic salts, compositions containing these compounds, methods for their preparation and the methods for achieving a pharmacologic effect of peristaltic stimulation.

This application is a continuation-in-part of our copending application, Ser. No. 189,286, filed Apr. 23, 1962, which in turn was a continuation-in-part of applicants' then co-pending application, Ser. No. 760,534, filed Sept. 12, 1958, now abandoned.

It has been customary for many years to prepare extracts of senna by extracting the drug with water, using either the aqueous infusion or the more concentrated liquid extract obtained by evaporating aqueous macerates. More recently, Stoll et al., Helv. Chim. Act., 1949, 32:1892, were able to isolate from senna two active principles, sennosides A and B, which methods have also been described in U.S. Patent No. 2,350,295.

With the development in recent years of a chemical method of assay for sennosides in senna by Fairbairn & Michaels, J. Pharm. Pharmacol., 1950, 2:807, 813, it was discovered that a considerable proportion of sennosides were lost when aqueous extracts were prepared. Later, Fairbairn & Saleh, J. Pharm. Pharmacol., 1951, 3:918, were able to show, by using a biological method of assay, that the crude drug was much more active than could be anticipated from its sennosides content as determined by chemical assay, the latter, which are rhein glycosides, accounting for about 60 percent of the total biologic activity of the drug. These authors also showed that a small proportion of non-rhein glycosides of the anthraquinone group was present, but that some 30 percent of the biologic activity remained unaccounted for.

As a result of these observations and our own experimental work, it became apparent that senna extracts of commerce suffer from the following defects:

1. A very substantial loss of the active glycosides originally present in the senna.

2. Their biologic activity is equivalent only to their sennosides content, the extra associated activity present in the senna being lost.

The object of the present invention is to extract a substance possessing not only the sennosides activity but also the extra associated activity, to concentrate it into highly active water-soluble forms, and to recover new active extract of senna primary glycosides as well as extracts of varying degrees of activity but all more active than any products from senna heretofore known in the art.

According to the invention the objects are achieved by a process comprising the steps of extracting the senna with a neutral aqueous organic solvent, or an aqueous organic solvent to which an organic acid has been added but in character and amount that will not debase the primary glycoside, and adding to the separated macerate a metal salt, preferably an alkaline earth metal, salt, e.g., sodium carbonate, potassium bicarbonate, magnesium carbonate, calcium acetate, magnesium acetate and sodium citrate and an anhydrous organic solvent to cause precipitation of a water-soluble product comprising the active principles of the senna as a salt of the precipitating metal ion. The water-soluble salt thus obtained comprises the respective basic metal salt of 1,1'-dihydroxy-3,3'-dicarboxy-8,8'-digentiobiosyloxy-10,10'-dihydro-dianthrone. Thus, for example, if calcium acetate is used as the precipitating metal salt, the calcium salt of 1,1'-dihydroxy-3,3'-dicarboxy-8,8'-digentiobiosyloxy-10,10'-dihydrodianthrone will be obtained in intimate association with other active principles of the senna and if sodium carbonate, potassium bicarbonate or magnesium carbonate is used as the precipitating salt, then the respective sodium, potassium or magnesium salt of 1,1'-dihydroxy-3,3'-dicarboxy-8,8'-digentiobiosyloxy-10,10'-dihydrodianthrone, will be obtained. The process will normally comprise further steps as described hereafter but it should be mentioned that the aforesaid water-soluble product is useful as such in the dry form or in solution, and since it possesses a high concentration of the active principles of senna, it is suitable for administration and may be incorporated in any of the usual medicinal forms such as, for example, powders, compressed or molded tablets or pills, capsules, cachets, chocolate, chewing gum, pastilles, lozenges, granules, suppositories, enemas, syrups, elixirs, or injections, either alone or with other therapeutic agents.

One of the products thus obtainable is a stable non-hygroscopic powder which comprises the aforesaid respective basic metal salt, as for example, calcium 1,1'-dihydroxy-3,3'-dicarboxy - 8,8' - digentiobiosyloxy-10,10'-dihydrodianthrone and which may be stored for long periods without deterioration. It contains 25 to 35 percent of rhein glycosides by chemical assay and possesses an activity when determined by biological assay about 40 percent greater than could be expected from the rhein glycosides as determined by the chemical assay.

The said further steps in the process comprise dissolving the aforesaid water-soluble product in water and treating the solution with an agent serving to free it from metal ions. The treatment may be the addition of an organic acid to produce and precipitate a water-insoluble salt of the metal, and removing the precipitate so as to recover a solution of the active principles. Alternatively, the treatment is effected with an ion-exchange resin whereby there is obtained a solution of the active principles free from metal ions.

In either case, the resulting solution, preferably after evaporation under reduced pressure at a temperature not exceeding 30° C. in order to remove a substantial amount of water, is caused to precipitate the active principles as a water-soluble solid, by mixing with an anhydrous solvent such as isopropanol. The resultant compound, 1,1'-dihydroxy-3,3'-dicarboxy - 8,8' - digentiobiosyloxy-10,10'-dihydrodianthrone, is obtained in substantially pure form as a result of this treatment.

The portion of the senna used may be the entire plant, the leaf, and/or the pod (with or without seed), preferably in powder form. The process may be performed as follows:

The first stage is to extract the active principles of the senna, preferably completely with either (a) a pH neutral aqueous organic solvent, preferably 70 percent ethanol, 70 percent acetone or 70 percent isopropanol, using desirably a v./w. ratio of approximately 16:1 solvent to senna or, (b) the same aqueous solvent together with an organic acid whereby the v./w. ratio of solvent to senna is reduced to approximately 7:1. The separated macerate is treated with calcium acetate and anhydrous solvent, e.g., ethanol, acetone or isopropanol, in each case using one to three volumes of anhydrous solvent to one of macerate. A precipitate of a product consisting of the active principles together with calcium is formed, which is filtered off, the resulting filter cake, containing the greater part of the activity of the senna, being dried at atmospheric temperature under conditions of low humidity. The product obtained as a result of this step is the calcium salt of 1,1'-dihydroxy-3,3'-dicarboxy-8,8'-digentiobiosyloxy-10,10'-dihydrodianthrone together with other precipitated senna principles. It is the calcium 1,1'-dihydroxy-3,3'-dicarboxy-8,8'-digentiobiosyloxy-10,10'-dihydrodianthrone which is the portion containing the greater part of the activity of the precipitate.

It will be appreciated that the proportions of the materials used may be varied over substantial ranges. For instance, the concentration of the aqueous extracting solvent, although preferred as about 70 percent, may be desirably within the range of about 50 percent to about 80 percent. The most desirable solvents are substantially pH neutral aqueous organic solvents which solvents do not substantially change the activity of the principles being extracted. Exemplifying such solvents there may be mentioned liquid alkanols of from 1 through 3 carbons, such as methanol, ethanol, propanol, isopropanol, acetone, dioxane, and mixtures thereof. Higher alcohols like butyl and amyl are not as useful since most desirably the alcohols should be substantially completely miscible with water in practically all proportions.

If an organic acid is added to the solvent, the amount is preferably about 2 percent based on the weight of the senna, but desirably it may be within the range of about 1 percent to about 6 percent, and even higher. The solvent or solvent and acid combination should not effect the primary glycoside to any undesirable degree. The acid, for example, may be monobasic, dibasic and tribasic, water-soluble aliphatic acids, illustrated by lower acids of the acetic series such as acetic, propionic, butyric and polybasic acids such as tartaric, succinic, maleic, and citric, and mixtures thereof. When an acid is present the v./w. ratio of solvent to senna may be within the range of about 5:1 to about 15:1, but when an acid is not present the ratio may be within the range of about 10:1 to about 30:1.

The metal salts added to the separated macerate may be, desirably, alkaline earth metal salts, such as calcium, magnesium, sodium, potassium and lithium. These metal salts are desirably salts of organic acids, as enumerated above. However, the carbonate and bicarbonate salts may also be utilized. The amount of metal salt, as for example, calcium acetate, which is added, is preferably within the range of about 2 percent to about 10 percent, based on the weight of the selected metal salts to be added to form the respective metal salt of 1,1'-dihydroxy-3,3'-dicarboxy-8,8'-digentiobiosyloxy-10,10'-dihydrodianthrone, is preferably within the range of from about 2 percent to about 10 percent, based upon the weight of the senna. The presence of an excess of the metallic ion is not critical and the respective metallic salt of the 1,1'-dihydroxy-3,3'-dicarboxy-8,8'-digentiobiosyloxy-10,10'-dihydrodianthrone, will be obtained in good yield when these concentrations are used. Thus, if the calcium, magnesium, sodium, potassium and lithium ions are used to form the metallic salt, then the calcium 1,1'-dihydroxy-3,3'-dicarboxy-8,8'-digentiobiosyloxy-10,10'-dihydrodianthrone; magnesium 1,1'-dihydroxy-3,3'-dicarboxy-8,8'-digentiobiosyloxy-10,10'-dihydrodianthrone; sodium 1,1'-dihydroxy-3,3'-dicarboxy-8,8'-digentiobiosyloxy-10,10'-dihydrodianthrone; potassium 1,1'-dihydroxy-3,3'-dicarboxy-8,8'-digentiobiosyloxy-10,10'-dihydrodianthrone or the lithium 1,1'-dihydroxy-3,3'-dicarboxy-8,8'-digentiobiosyloxy-10,10'-dihydrodianthrone is the metallic salt obtained. The dry metallic salt, together with precipitate of other principles of senna, which are obtained as a result of the above steps, may be utilized for further processing, although the resulting compositions obtained from the aforesaid procedure may be utilized directly in therapy.

The dried product which contains the appropriate salt of 1,1'-dihydroxy-3,3'-dicarboxy-8,8'-digentiobiosyloxy-10,10'-dihydrodianthrone, together with precipitated senna principles, which is obtained as a result of the above steps, is dissolved in water and treated with an appropriate organic acid in order to render insoluble the metallic ion present. Thus, when calcium is the metallic ion which is present, then oxalic acid may be used, as the precipitating acid. Such other acids which may be used to precipitate the respective metal ion include suitable inorganic acids, as for example, sulfuric acid, to form the insoluble calcium sulfate. In some instances, as for example, when the sodium, potassium, and lithium ions are used, then the acid may liberate the metal ion in a soluble form and require an organic solvent to precipitate it, as for example, the addition of acetone.

Alternatively, the solution of the water-soluble metallic salt obtained as described above, may be treated with a strongly acid ion exchange resin such as "Zeo-Karb 225" (H Form. The active principles, in either case, remain in solution and are precipitated from the filtrate (concentrated under reduced pressure, below 30° if necessary), by the addition of about four volumes of anhydrous solvent, e.g., ethanol, acetone, isopropanol or any of the other organic solvents alone or in admixture as set forth above. The precipitate is collected and dried at room temperature at low humidity.

The resulting dry powder is soluble in water and is a highly active stable concentrate containing the substantially pure 1,1'-dihydroxy-3,3'-dicarboxy-8,8'-digentiobiosyloxy-10,10'-dihydrodianthrone. When deseeded pod is utilized as a starting material, an activity index of 40 to 50 percent of rhein glycosides by chemical assay may be shown but which possesses an activity when determined by biological assay of about 40 percent greater than could be expected from the rhein glycosides as determined by the chemical assay.

Similar results are obtained both from pod with seed and from leaf, but the proportions of active substance in the final concentrates are lower. For example, the concentrate from pod with seed contained 30 to 40 percent of rhein glycosides by chemical assay, and that from leaf 25 to 35 percent, although each possesses an activity when determined by biological assay about 40 percent greater than its chemical assay result, exactly as in the case of the concentrate obtained from pod without seeds.

This highly active extract may be employed both in the dry form and in solution, and is suitable for administration in any of the usual medicinal forms such as those aforementioned.

The invention is based on the fact that the main active principle of senna is extracted as a primary glycoside, that is, a water-soluble primary anthracene glycoside. This primary glycoside exerts a desirable physiologic effect by stimulating peristalsis and may be obtained as the principal active agent of an especially prepared concentrate obtained from the senna plant or portions thereof, as well as in the pure form. This active principle has a different chemical composition from the active crystalline glycoside prepared in U.S. Patent No. 2,350,295; and its properties (biological, chemical and physical) are also completely different from the hitherto known glycosides of the senna plant, which are in fact breakdown products of the primary active principle of senna. A comparison of the properties of the active principle obtained as a result of the steps described in the present application with the known glycosides obtained as a result of practicing the teachings of U.S. Patent 2,350,295, clearly establishes the different nature, physical and chemical properties of the subject compound from those principles which were previously known. This comparison is presented in Tables A and B. The new subject active principle, which is termed "senna primary glycoside" is shown to have the following different chemical, physical and biological properties from those of the known sennosides (U.S. Patent 2,350,295).

1. The subject senna primary glycoside is very soluble in water; it is a glucose glucosyl glycoside (1,1'-dihydroxy-3,3' - dicarboxy - 8,8' - digentiobiosyloxy - 10,10' - dihydrodianthrone) having the graphic formula shown in FIGURE 1. The structure of the glycone (i.e., the glucose glucosyl moiety) is that of gentiobiose which is a disaccharide.

2. Sennoside (U.S. Patent 2,350,295) which is almost insoluble in water, is a secondary glucoside (8,8'-diglucosyl-10,10'-dihydrorheindianthrone) and has the graphic formula shown in FIGURE 2. The structure of the glucose is that of glucose, which is a monosaccharide.

3. Senna primary glycoside loses two molecules of glucose and is completely degraded into sennoside (U.S. Patent 2,350,295) by treatment with mineral acid in aqueous solution, the sennoside gradually precipitating as an insoluble crystalline powder. By this procedure, 1 gram of senna primary glycoside yields 0.72 gram of sennoside.

4. Alternatively, senna primary glycoside on being boiled in methanol, with or without the addition of small quantities of oxalic or citric acid, deposits crystals of sennoside. Alternatively, senna primary glycoside when boiled in glacial acetic acid or when catalytically hydrogenated over a palladium-charcoal catalyst affords two molecules of gentiobiose and one molecule of sennidine. Sennosides under these conditions give two molecules of glucose and one molecule of sennidine.

TABLE A.—COMPARISON OF PROPERTIES

| | Sennoside, U.S. Pat. 2,350,295 | Subject Glycoside |
|---|---|---|
| 1. Biological Activity (by bioassay) | 100 | 145. |
| 2. Chemical: | | |
| (a) C content | 58% | 52.5%. |
| H content | 4.5% | 4.9%. |
| (b) Aglycone content | 62% | 45.5%. |
| (c) Glucose content | 41.8% | 57.6%. |
| (d) Equivalent weight | 431 | 600. |
| (e) Acetyl conent of purified acetyl derivative. | 37.7 | 39. |
| Equiv. weight of acetyl derivative | 684 | 960. |
| (f) Action of 0.1 N acid | None | Gives sennosides. |
| (g) Consumption of KIO₄ per mol | 4 mol | 8 mol. |
| (h) Result of reduction with sodium dithionite. | Product soluble in ether | Product insoluble in ether. |
| 3. Physical: | | |
| (a) Color | Bright yellow | Buff yellow. |
| (b) Solubility in cold water | Traces | Very soluble (1 pt. in ⅛ parts). |
| (c) Molecular weight (Isopiestic method) | 862 | 1,165. |
| (d) Paper chromatography R_f values (by ascending technique) using Whatmans No. 1 paper. | 0 | 1.0. |
| | A     B | |
| (e) Melting point | 200–240° C.. 180–186° C... | 157–160° C. (dec.). |
| (f) Specific Rotation $[\alpha]_d^{19}$ | −160°........ −100°........ | 0°. |
| (g) Absorption spectra: | | |
| $UV^{\lambda\ max.}_{1\%}$ m$\mu$ | 270......... 270......... | 265. |
| $E^{1\ cm.}_{\lambda\ max.}$ m$\mu$ | 235......... 229......... | 218. |
| Note: These values are not altered by recrystallizing the materials twice from ethyl Cellosolve and once from dimethyl-formamide with isopropyl alcohol. | | |
| (h) Molecular Extinction | 20,270....... 19,750....... | 25,800. |

TABLE B.—PAPER CHROMATOGRAPHIC COMPARISONS OF SENNOSIDES A AND B WITH THE SUBJECT PRIMARY GLYCOSIDE

| | R_f Values | | |
|---|---|---|---|
| Solvent | Sennosides * | | Subject Primary Glycoside |
| | A | B | |
| n-Butanol-acetic acid-water (4-1-5) | 0.53 | 0.54 | 0.43 |
| n-Butanol-ethanol-water (5-1-4) | 0.16 | 0.17 | 0.05 |
| Butanol-ethylacetate-pyridine-water (1-1-1-1) | 0.32 | 0.35 | 0.17 |
| 78% ethanol; paper impregnated with Na₂CO₃ | 0.10 | 0.10 | 0.07 |

*U.S. Patent No. 2,350,295.

5. Biological activity. 1 gram of senna primary glycoside, although it contains in chemical combination only the equivalent of 0.72 gram of sennoside, has nevertheless the biological activity of 1 gram of sennoside obtained as a result of U.S. Patent No. 2,350,295.

The senna glycoside (obtained through applicants' process) is a primary glycoside and is very soluble in water; it is a glucose glucosyl glycoside (1,1'-dihydroxy-3,3'-dicarboxy-8,8'-digentiobiosyloxy-10,10'-dihydrodianthrone) having the graphic formula shown in FIGURE 1. The structure of the glycone (i.e., the glucose glucosyl moiety) is that of gentiobiose, which is a disaccharide.

Sennoside (U.S. Patent No. 2,350,295), which is almost insoluble in water, is a secondary glycoside (8,8'-diglucosyl - 10,10' - dihydrorheindianthrone) and has the graphic formula shown in FIGURE 2. The structure of the glycone is that of glucose which is a monosaccharide. The compound 1,1'-dihydroxy-3,3'-dicarboxy-8,8'-digentiobiosyloxy-10,10'-dihydrodianthrone is obtained in the pure form from the concentrate prepared as described above, as well as directly from the senna plant. The procedures consist of extracting the senna plant with an aqueous organic solvent in which the active principles are soluble but in which the inactive matter is not. A suitable aqueous organic solvent for this purpose is from 70 to 85 percent alcohol and 85 percent isopropanol is preferred. The extract obtained in this way may be further treated in order to obtain the desired compound in a highly pure form. The concentrates previously described may also be utilized in this further treatment to obtain the pure compounds.

Essentially the steps involved are as follows: The product, which may either be the extract of the senna plant or the concentrates containing the active principle, prepared as described above, are dissolved in an aqueous organic solvent, as for example, 85 percent isopropanol, or any other suitable aqueous organic solvent, in which the active principles are soluble, but in which some of the inactive matter is insoluble. The solution is filtered and the filtrate evaporated under reduced pressure at a temperature not exceeding 30° C. The evaporate is then precipitated with an organic solvent such as anhydrous isopropanol, and the precipitate is then dissolved in an aqueous organic solvent, e.g., 85 percent isopropanol. The solution is passed through a cellulose column or celite-charcoal column and the eluate is then concentrated and precipitated with an anhydrous organic solvent such as isopropanol. The precipitate may then be dissolved by warming in an aqueous organic solvent at relatively high concentration, e.g., 90 percent isopropanol, and the solution allowed to crystallize. The crystals may then be separated and dried, preferably under reduced pressure and at atmospheric temperature.

The product, 1,1'-dihydroxy-3,3'-dicarboxy-8,8'-digentiobiosyloxy-10,10'-dihydrodianthrone, is a buff yellow crystalline powder, very soluble in cold water which differs markedly from sennosides A and B. It has a melting point of 157° to 159° C. (with decomposition), a molecular weight of 1164 as determined by the isopiestic method, and an equivalent weight of about 615 when determined by potentiometric titration. Sennosides are almost insoluble in cold water; they have a molecular weight of 862, an equivalent weight of 461 and melting points of, for A, 210–240° C. (with decomposition), and, for B, 180–186° C. (with decomposition). The new substance is an active glycoside, based on rhein, in a pure state of purity, and contains the equivalent of 73 percent of sennosides by chemical assay, whereas its activity by biological assay is equivalent to a content of 100 to 110 percent of sennosides. It is stable when stored in well closed containers and is suitable for administration in any of the usual medicinal forms.

The compound, 1,1'-dihydroxy-3,3'-dicarboxy-8,8'-digentiobiosyloxy-10,10'-dihydrodianthrone, may be reacted with alkali metal basic salts, as for example, sodium, potassium, lithium, magnesium and calcium, carbonate, bicarbonates or hydroxides, to form the corresponding alkali metal salt of 1,1'-dihydroxy-3,3'-dicarboxy-8,8'-digentiobiosyloxy-10,10'-dihydrodianthrone. It is preferred that the carbonate or the bicarbonate of the respective metal be used to form the salt, since the carbon dioxide which is formed in the course of this reaction evolves from the solution, leaving a substantially pure metal salt of 1,1'-dihydroxy-3,3'-dicarboxy-8,8'-digentiobiosyloxy-10,10'-dihydrodianthrone. The salts obtained are sodium 1,1'-dihydroxy-3,3'-dicarboxy-8,8'-digentiobiosyloxy-10,10'-dihydrodianthrone; potassium 1,1'-dihydroxy-3,3'-dicarboxy-8,8'-digentiobiosyloxy-10,10'-dihydrodianthrone; lithium 1,1'-dihydroxy-3,3'-dicarboxy-8,8'-digentiobiosyloxy-10,10'-dihydrodianthrone; calcium 1,1'-dihydroxy-3,3'-dicarboxy-8,8'-digentiobiosyloxy-10,10'-dihydrodianthrone.

The present invention enables the achievement of a desired physiologic effect, for example, peristaltic stimulation of the gastrointestinal tract of a mammal. This is accomplished by the administration into the alimentary tract (i.e., through the oral or rectal routes), of the products of the present invention, either combined with a pharmaceutically acceptable vehicle or used alone. Preferably, the 1,1'-dihydroxy-3,3'-dicarboxy-8,8'-digentiobiosyloxy-10,10'-dihydrodianthrone will be administered rather than a composition containing the same, although from the viewpoint of desired physiologic effect, the same qualitative pharmacologic actions will result.

Desirably, the biologically active dosage forms will contain a range in concentration of active ingredient of from 1 mg. to 40 mg. of the new rhein glycosides, as determined by chemical and biologic assay, per unit dose. The total daily dose to be administered to humans and animals, will usually be within the range of from 1 mg. to 40 mg. of the active compound. The specific total daily dose will depend upon the therapeutic goal and the particular status of the patient. Thus, if a strong purgative effect is desired, the upper range in dosage will be utilized, whereas if a milder laxative effect is intended, then the lower dosage range will be administered. Similarly, an infant, a geriatric patient and a debilitated patient, will require less of the new compound than will a patient who has an occasional episode of constipation. The individual (human or animal) having certain pathologic disorders of the gastrointestinal tract, may also require appropriate adjustment in dosage. Thus, the patient with Hirschsprung's disease, will require a larger dose of the new compound than will a patient who has a spastic type of constipation.

The particular dosage forms to be used in the administration of these new compounds include tablets, granules, powders, capsules, solutions, and suppositories. In preparing these individual dosage forms, either the 1,1'-dihydroxy-3,3'-dicarboxy-8,8'-digentiobiosyloxy-10,10'-dihydrodianthrone, or a preparation containing 1,1'-dihydroxy-3,3'-dicarboxy-8,8'-digentiobiosyloxy-10,10'-dihydrodianthrone or the appropriate metallic salts of 1,1'-dihydroxy-3,3'-dicarboxy-8,8'-digentiobiosyloxy-10,10'-dihydrodianthrone, may be utilized, adjusting the particular concentration to be within the range of from 1 mg. to 40 mg. per unit dose, based upon the quantity of 1,1'-dihydroxy-3,3'-dicarboxy-8,8'-digentiobiosyloxy-10,10'-dihydrodianthrone, as determined by chemical and biologic assay.

The following examples illustrate the scope of this invention.

EXAMPLE 1

One kilogram of powdered senna pod, freed from seeds, is mixed with 6 liters of 70 percent ethanol containing 20 g. citric acid, stirred for a period of six hours, and then set aside for 15 hours. The mixture is filtered under slightly reduced pressure, the marc being mixed with a further liter of 70 percent ethanol and again filtered. The combined filtrates, about 6.5 liters, are mixed with 45 g. of anhydrous calcium acetate which is added slowly, and after a few minutes a buff colored precipitate separates. Stirring is continued for about ten minutes, 6.5 liters of anhydrous ethanol are added, and the precipitate collected and dried at atmospheric temperature in a low humidity chamber. The dry precipitate, which contains the calcium salt of 1,1'-dihydroxy-3,3'-dicarboxy-8,8'-digentiobiosyloxy-10,10'-dihydrodianthrone, is powdered; it weighs about 120 to 150 gm. and contains 25 to 35 percent of rhein glycosides by chemical assay, its total activity determined by biologic assay being equivalent to 35 to 50 percent of sennosides.

EXAMPLE 2

In place of the calcium acetate used as described in Example 1 above, there may be substituted any pharmasolution as an enema and in this event, the unit dose may be as large as 1 quart, and as low as 4 ounces. However, the concentration of active ingredient per unit dose does not change, i.e., from 1 to 40 mg. of active ingredient per unit dose.

When a solid dosage form is desired, as for example, capsules, tablets, powders, granules or suppositories, then these may be prepared by combining either 1,1'-dihydroxy-3,3'-dicarboxy-8,8'-digentiobiosyloxy - 10,10' - dihydrodianthrone, its basic metallic salts or a preparation containing the same, with a pharmaceutically acceptable carrier, and this is then manufactured into the appropriate dosage forms. In the preparation of tablets, a diluent such as starch, lactose or sucrose may be used, in proportions of from 10 to 90 percent of the concentration of the active substance utilized. To this mixture is added a pharmaceutically acceptable binding agent, such as gum acacia, tragacanth, or polyvinyl pyrrolidone and a pharmaceutically acceptable lubricant such as magnesium stearate. After granulating the mixture, the tablets are compressed into suitable size and shape, each tablet containing from 1 mg. to 40 mg. of the active substances.

Capsules may be prepared by filling a suitable gelatin capsule with either 1,1'-dihydroxy-3,3'-dicarboxy-8,8'-digentiobiosyloxy-10,10'-dihydrodianthrone, the metal salts of 1,1' - dihydroxy - 3,3'-dicarboxy-8,8'-digentiobiosyloxy-10,10'-dihydrodianthrone or compositions containing the same. It may be preferred to mix the active substance with a suitable diluent prior to the filling of the capsule and such diluents as starch, lactose and sucrose may be used. Granules and tablets are prepared by either granulating the tablet formulation prior to compression into tablets or by mixing the selected active substance with a granulating vehicle, as for example:

| | Parts |
|---|---|
| Mannitol | 80 |
| Sucrose | 15 |
| Magnesium stearate | 5 |

The proportion of the granulating vehicle to the active ingredient is from 10 to 90 parts of granulating vehicle to from 90 to 10 parts of active substance. After intimately mixing the two components, the mixture is moistened with water or alcohol or mixtures of these, and passed through a screen having a porosity, or mesh size, of not smaller than No. 8 U.S. standard mesh. The resultant granules are then air dried. The amount of granules to be administered per unit dose will depend upon the concentration of active ingredient per gram of granules, to result in a range of from 1 to 40 mg. per unit dose. Powders may be prepared by using the same formulation as is used for the granules but reducing the particle size to below a No. 60 standard mesh size.

When a suppository is desired, then an appropriate quantity of the desired active ingredient is mixed with a pharmaceutically acceptable suppository base, such as cocoa butter, carbowax, cetyl alcohol and mixtures of these and the whole molded into suppositories of about 2 gm. in weight. The range in concentration of active ingredient per suppository is from 1 to 40 mg. of active ingredient.

What is claimed is:

1. A compound selected from the group consisting of 1,1' - dihydroxy-3,3'-dicarboxy-8,8'-digentiobiosyloxy-10, 10'-dihydrodianthrone and its pharmaceutically acceptable metal salts.

2. 1,1'-dihydroxy - 3,3' - dicarboxy-8,8'-digentiobiosyloxy-10,10'-dihydrodianthrone.

3. The calcium salt of 1,1'-dihydroxy-3,3'-dicarboxy-8,8'-digentiobiosyloxy-10,10'-dihydrodianthrone.

4. The sodium salt of 1,1'-dihydroxy-3,3'-dicarboxy-8,8'-digentiobiosyloxy-10,10'-dihydrodianthrone.

5. The potassium salt of 1,1'-dihydroxy-3,3'-dicarboxy-8,8'-digentiobiosyloxy-10,10'-dihydrodianthrone.

6. The lithium salt of 1,1'-dihydroxy-3,3'-dicarboxy-8,8'-digentiobiosyloxy-10,10'-dihydrodianthrone.

7. The magnesium salt of 1,1'-dihydroxy-3,3'-dicarboxy-8,8'-digentiobiosyloxy-10,10'-dihydrodianthrone.

8. The process of preparing 1,1'-dihydroxy-3,3'-dicarboxy-8,8'-digentiobiosyloxy - 10,10' - dihydrodianthrone which comprises the steps of:

(a) adding to a vegetable substance containing 1,1'-dihydroxy-3,3'-dicarboxy-8,8'-digentiobiosyloxy - 10, 10'-dihydrodianthrone selected from the group consisting of senna, an extract of senna, senna pod and deseeded senna pod, a substantially pH neutral aqueous organic solvent, said solvent containing from 20 to 50 percent of water and said organic solvent selected from the group consisting of methanol, ethanol, propanol, isopropanol, acetone, dioxane, and mixtures of these, or an aqueous organic solvent containing from 20 to 50 percent of water, said organic solvent being selected from the group consisting of methanol, ethanol, propanol, isopropanol, acetone, dioxane and mixtures of these and from 1 to 6 percent by weight of an organic acid, soluble in said aqueous organic solvent, (b) separating any insoluble material from the resulting liquid extract, and (c) adding to said liquid extract an ionizable metal compound selected from the group of metals consisting of sodium, potassium, lithium, magnesium, and calcium, and (d) adding an anhydrous form of said organic solvent to precipitate a first water-soluble product containing 1,1'-dihydroxy-3,3'-dicarboxy-8,8'-digentiobiosyloxy-10,10'-dihydrodianthrone, in the form of the salt of said metal moiety added, (e) isolating said precipitated first water-soluble product containing said metal salt of 1,1'-dihydroxy-3,3'-dicarboxy-8,8'-digentiobiosyloxy - 10,10' - dihydrodianthrone, (f) dissolving said first water-soluble product in water, (g) treating the resultant aqueous solution with an agent selected from the group consisting of cationic ion exchange resin and acid ions which precipitate the metal moiety present in the form of said salt of 1,1'-dihydroxy-3,3'-dicarboxy-8,8'-digentiobiosyloxy-10,10'-dihydrodianthrone, filtering, evaporating to low volume and adding an anhydrous form of said organic solvent to precipitate a second water-soluble product, (h) redissolving said second water-soluble product in said aqueous organic solvent, passing the resultant solution through an adsorbing column, concentrating the eluate and isolating 1,1'-dihydroxy-3,3'-dicarboxy-8,8'-digentiobiosyloxy - 10,10' - dihydrodianthrone therefrom.

9. The method of preparation of a laxative compound containing the metal salt of 1,1'-dihydroxy-3,3'-dicarboxy-8,8' - digentiobiosyloxy-10,10'-dihydrodianthrone, which comprises the steps of:

(a) adding to a vegetable substance containing 1,1'-dihydroxy-3,3'-dicarboxy - 8,8' - digentiobiosyloxy-10,10'-dihydrodianthrone selected from the group consisting of senna, senna pod, an extract of senna and deseeded senna pod, a pH neutral aqueous organic solvent containing from 20 to 50 percent by weight, of water, and an organic solvent selected from the group consisting of ethanol, methanol, isopropanol, acetone, dioxane and mixtures of these, or an aqueous organic solvent containing from 20 to 50 percent by weight, of water and an organic solvent selected from the group consisting of methanol, ethanol, propanol, isopropanol, acetone, dioxane and mixtures of these and at least 1 percent of an organic acid, (b) separating any insoluble material from the resultant liquid mixture, and (c) adding to said filtered liquid an ionizable metal compound in which said metal moiety is selected ceutically acceptable metal salt which is soluble in the solvent system used. When such metal ions as sodium, potassium and lithium are utilized, it may be necessary to fractionally precipitate the final product by concentrating the solvent under reduced pressure. The resultant precipitate is dried and contains the appropriate metal salt of 1,1' - dihydroxy-3,3'-dicarboxy-8,8'-digentiobiosyloxy-10,10'-dihydrodianthrone. Under certain conditions it may be desirable to utilize the carbonate, bicarbonate or hydroxide of the metal ion, even though it may be insoluble in the particular solvent system utilized. When these insoluble metallic salts are used, then these must be finely subdivided and added to the reaction mixture while stirring for a sufficient period of time to insure complete reaction. The neutralization and change in pH will afford a reliable index as to the course of the reaction. It is important to note that careful pH control is necessary in order to avoid hydrolytic cleavage of the primary glycoside.

EXAMPLE 3

The dry precipitate, which contains the calcium salt of 1,1'-dihydroxy-3,3'-dicarboxy - 8,8'- digentiobiosyloxy-10,10'-dihydrodianthrone, prepared according to Example 1, is dissolved in 220 ml. of water, the resulting solution being mixed with 20 gm. of powdered oxalic acid, stirring being continued for a further 15 minutes. The mixture is filtered and the filtrate, which measure about 300 ml., is poured slowly into 1.2 liters of isopropanol, which is constantly stirred. The resulting brown precipitate of highly active concentrate is collected, washed with 200 ml. of ethanol and dried in a low humidity chamber at atmospheric temperature; it weighs 50 to 60 gm. and contains 40 to 50 percent of rhein glycosides by chemical assay, its total activity determined by biological assay being equivalent to 55 to 70 percent of sennosides. This precipitate contains 1,1'-dihydroxy-3,3'-dicarboxy-8,8'-digentiobiosyloxy-10,10'-dihydrodianthrone.

EXAMPLE 4

The dry precipitate, prepared according to Example 1, is dissolved in 1600 ml. of water, 200 gm. of a strongly acid ion exchange resin, such as the commercial brand known as "Zeo-Karb 225" (H Form) are added and the mixture well stirred until the solution no longer contains calcium ions. The solution is filtered and the filtrate evaporated to 250–300 ml. under reduced pressure and at a temperature not exceeding 30° C. After removal of small quantities of insoluble matter by filtration, the brown solution is poured into 1.2 liters of isopropanol with constant stirring. The resulting brown precipitate of highly active concentrate is collected, washed with 200 ml. of ethanol and dried in a low humidity chamber at atmospheric temperature; it weighs 50 to 60 gm. and contains 40 to 50 percent of rhein glycosides by chemical assay, its total activity determined by biological assay being equivalent to 55 to 70 percent of sennosides. This precipitate contains 1,1'-dihydroxy-3,3'-dicarboxy-8,8'-digentiobiosyloxy-10,10'-dihydrodianthrone.

EXAMPLE 5

One kilogram of powdered senna pod is mixed with 12 liters of cold neutral 70 percent ethanol for 8 hours. After filtration the cake is washed with a further 4 liters of the same solvent. The combined filtrates are stirred with 40 gm. of anhydrous calcium acetate for about 15 minutes. Seventeen liters of acetone are added, and the precipitate collected and dried at atmospheric temperature under reduced pressure. The dry product, about 100 to 150 gm., is powdered and dissolved in 1.5 to 2 liters of water, and stirred with about 200 to 300 gm. of "Zeo-Karb 225" (H form), until the solution is free from calcium ions. The solution is filtered and the filtrate evaporated below 30° C. under reduced pressure to about 200 ml. One liter of isopropanol is added and the resulting yellowish brown precipitate collected and dried over $P_2O_5$ at room temperature. The product is substantially the same as that produced according to Example 3 and contains 1,1'-dihydroxy-3,3'-dicarboxy - 8,8'- digentiobiosyloxy-10,10'-dihydrodianthrone.

EXAMPLE 6

Fifteen gm. of the extract as produced by the preceding examples is mixed with about 400–500 ml.-85 percent isopropanol, in order to dissolve all the active principles. The mixture is filtered and the filtrate evaporated to a thick, syrupy consistency under reduced pressure at below 30° C. About 150–200 ml. of isopropanol is now added and the brownish yellow precipitate which results is separated by filtration. The filter cake so obtained is dissolved in about 500 ml. of 85 percent isopropanol and the solution passed through a column containing about 150 gm. of powdered cellulose. The column is then washed with 85 percent isopropanol until the eluate is almost colorless, and the total eluate evaporated to a syrup under reduced pressure at below 30° C. About 150 ml. of isopropanol is added and the resulting yellowish precipitate separated by filtration. The filter cake obtained in this way is dissolved in about 100 ml. of 90 percent isopropanol by warming and the solution allowed to crystallize. The crystals are then separated and dried in vacuo at atmospheric temperature. About 4 gm. of the active principle in the form of a buff yellow crystalline powder is obtained.

EXAMPLE 7

To 0.02 mol of 1,1'-dihydroxy-3,3'-dicarboxy-8,8'-digentiobiosyloxy - 10,10' - dihydrodianthrone, dissolved in 100 cc. of water, is added 0.04 mol of sodium bicarbonate. When the reaction is complete, 600 ml. of an anhydrous alcohol, such as isopropanol is added to precipitate the sodium salt of 1,1'-dihydroxy-3,3'-dicarboxy-8,8'-digentiobiosyloxy-10,10'-dihydrodianthrone, which is filtered and dried.

EXAMPLE 8

In place of the sodium bicarbonate used in Example 7 above, there may be substituted in equivalent amounts, sodium hydroxide, sodium carbonate, potassium hydroxide, potassium carbonate, potassium bicarbonate, lithium carbonate, lithium bicarbonate, lithium hydroxide, magnesium carbonate, magnesium hydroxide, calcium carbonate and calcium hydroxide, the remainder of the steps being the same and the respective metal salt of 1,1'-dihydroxy-3,3'-dicarboxy - 8,8'- digentiobiosyloxy-10,10'-dihydrodianthrone is obtained, namely: the sodium salt of 1,1'-dihydroxy-3,3'-dicarboxy - 8,8'- digentiobiosyloxy-10,10'-dihydrodianthrone; the potassium salt of 1,1'-dihydroxy-3,3'-dicarboxy - 8,8'-digentiobiosyloxy-10,10'-dihydrodianthrone; the lithium salt of 1,1'-dihydroxy-3,3'-dicarboxy-8,8'-digentiobiosyloxy- 10,10'-dihydrodianthrone; the magnesium salt of 1,1'-dihydroxy-3,3'-dicarboxy-8,8'-digentiobiosyloxy-10,10'-dihydrodianthrone, and the calcium salt of 1,1'-dihydroxy-3,3'-dicarboxy-8,8'-digentiobiosyloxy-10,10'-dihydrodianthrone.

EXAMPLE 9

When the 1,1'-dihydroxy-3,3'-dicarboxy-8,8'-digentiobiosyloxy-10,10'-dihydrodianthrone or its metal salts are utilized in the preparation of solutions, the vehicle may be either water, glycerin, propylene glycol, syrup or mixtures of these. The solutions are prepared by direct dissolution of the appropriate quantity of the active ingredient, in approximately 80 percent of the final volume of the amount of solution to be prepared of the particular vehicle chosen. When all of the active ingredients have been added and dissolved in the vehicle, the solution is filtered and brought to proper volume with additional amounts of vehicle. A convenient unit dosage range is 5 cc. or 1 teaspoonful and the concentration of active ingredient may be adjusted therein to be from 1 mg. to 40 mg. per unit dose. It may be desired to employ a from the group consisting of sodium, potassium, lithium, magnesium, calcium, and (d) adding an anhydrous form of said organic solvent to precipitate a water-soluble product containing the metal salt of 1,1'-dihydroxy-3,3'-dicarboxy-8,8'-digentiobiosyloxy-10,10'-dihydrodianthrone and isolating said precipitate in the dry form.

10. The process of preparing 1,1'-dihydroxy-3,3'-dicarboxy-8,8'-digentiobiosyloxy - 10,10' - dihydrodianthrone which comprises the steps of:
(a) dissolving in water the precipitated water-soluble product obtained as described in claim 9,
(b) treating the resultant aqueous solution with an agent selected from the group consisting of cationic ion exchange resin and acid ions which precipitate the metal ions present in said aqueous solution,
(c) separating the liquid phase,
(d) concentrating the liquid phase and adding an anhydrous form of an organic solvent selected from the group consisting of ethanol, methanol, propanol, isopropanol, acetone, dioxane and mixtures of these, and
(e) isolating the formed 1,1'-dihydroxy-3,3'-dicarboxy-8,8'-digentiobiosyloxy - 10,10' - dihydrodianthrone therefrom.

11. The process of preparing a metal salt of 1,1'-dihydroxy-3,3'-dicarboxy - 8,8' - digentiobiosyloxy-10,10'-dihydrodianthrone which comprises the steps of dissolving 1,1'-dihydroxy-3,3'-dicarboxy - 8,8' - digentiobiosyloxy-10,10'-dihydrodianthrone in water, adding a metal compound selected from the group of meta's consisting of sodium bicarbonate, sodium carbonate, sodium hydroxide, potassium hydroxide, potassium carbonate, potassium bicarbonate, lithium carbonate, lithium bicarbonate, lithium hydroxide, magnesium carbonate, magnesium hydroxide, calcium carbonate and calcium hydroxide, adding an anhydrous organic solvent from the group consisting of ethanol, methanol, and isopropanol, and isolating the formed metal salt of 1,1'-dihydroxy-3,3'-dicarboxy-8,8'-digentiobiosyloxy-10,10'-dihydrodianthrone, namely the sodium salt of 1,1'-dihydroxy-3,3'-dicarboxy-8,8'-digentiobiosyloxy-10,10'-dihydrodianthrone, potassium salt of 1,1'-dihydroxy-3,3'-dicarboxy - 8,8' - digentiobiosyloxy-10,10'-dihydrodianthrone, lithium salt of 1,1'-dihydroxy-3,3'-dicarboxy - 8,8' - digentiobiosyloxy - 10,10' - dihydrodeanthrone; calcium salt of 1,1'-dihydroxy-3,3'-dicarboxy-8,8'-digentiobiosyloxy-10,10'-dihydrodianthrone and magnesium salt of 1,1'-dihydroxy-3,3'-dicarboxy-8,8'-digentiobiosyloxy-10,10'-dihydrodianthrone.

12. The process of preparing the calcium salt of 1,1'-dihydroxy-3,3'-dicarboxy - 8,8' - digentiobiosyloxy-10,10'-dihydrodianthrone which comprises the steps of adding an ionizable calcium compound to a solution of 1,1'-dihydroxy-3,3'-dicarboxy - 8,8' - digentiobiosyloxy-10,10'-dihydrodianthrone dissolved in a solvent selected from the group consisting of water, methanol, ethanol, propanol, isopropanol, acetone, dioxane and mixtures of these and recovering the formed calcium salt of 1,1'-dihydroxy-3,3'-dicarboxy-8,8'-digentiobiosyloxy - 10,10' - dihydrodianthrone.

13. The process of preparing the magnesium salt of 1,1'-dihydroxy - 3,3' - dicarboxy - 8,8' - digentiobiosyloxy-10,10'-dihydrodianthrone which comprises the steps of adding an ionizable magnesium compound to a solution of 1,1'-dihydroxy - 3,3' - dicarboxy-8,8'-digentiobiosyloxy-10,10'-dihydrodianthrone dissolved in a solvent selected from the group consisting of water, methanol, ethanol, propanol, isopropanol, acetone, dioxane and mixtures of these and recovering the formed magnesium salt of 1,1'-dihydroxy-3,3'-dicarboxy - 8,8' - digentiobiosyloxy-10,10'-dihydrodianthrone.

14. The method of achieving a laxative effect in a mammal which comprises the steps of introducing into the alimentary tract of said mammal a preparation including a pharmaceutical carrier and from 1 to 40 mg. of a compound selected from the group consisting of 1,1'-dihydroxy-3,3'-dicarboxy - 8,8' - digentiobiosyloxy-10,10'-dihydrodianthrone and its pharmaceutically acceptable metal salts.

15. The method of achieving a laxative effect in a mammal which comprises the steps of introducing into the alimentary tract of said mammal a preparation including a pharmaceutical carrier and from 1 to 40 mg. of 1,1'-dihydroxy-3,3'-dicarboxy - 8,8' - digentiobiosyloxy-10,10'-dihydrodianthrone.

16. The method of achieving a laxative effect in a mammal which comprises the steps of introducing into the alimentary tract of said mammal a preparation including a pharmaceutical carrier and from 1 to 40 mg. of a compound selected from the group consisting of the sodium salt of 1,1'-dihydroxy-3,3'-dicarboxy - 8,8' - digentiobiosyloxy-10,10'-dihydrodianthrone, magnesium salt of 1,1'-dihydroxy-3,3'-dicarboxy - 8,8' - digentiobiosyloxy-10,10'-dihydrodianthrone, lithium salt of 1,1'-dihydroxy-3,3'-dicarboxy-8,8'-digentiobiosyloxy - 10,10' - dihydrodianthrone, potassium salt of 1,1'-dihydroxy-3,3'-dicarboxy-8,8' - digentiobiosyloxy-10,10'-dihydrodianthrone, calcium salt of 1,1'-dihydroxy-3,3'-dicarboxy-8,8'-digentiobiosyloxy-10,10'-dihydrodianthrone and mixtures of these.

References Cited

Fairbairn et al.: J. Pharmacy and Pharmacol., vol. 3, No. 12, December 1951, pages 918–925.

SAM ROSEN, *Primary Examiner.*